(12) United States Patent
Nishihara

(10) Patent No.: US 7,281,354 B2
(45) Date of Patent: Oct. 16, 2007

(54) WEATHER STRIP

(75) Inventor: Kiyonori Nishihara, Hiroshima (JP)

(73) Assignee: Nishikawa Rubber Co., Ltd., Hiroshima-shi (JP)

( * ) Notice: Subject to any disclaimer, the term of this patent is extended or adjusted under 35 U.S.C. 154(b) by 323 days.

(21) Appl. No.: 10/940,456

(22) Filed: Sep. 13, 2004

(65) Prior Publication Data
US 2005/0076574 A1 Apr. 14, 2005

(30) Foreign Application Priority Data
Oct. 14, 2003 (JP) .............................. 2003-353780

(51) Int. Cl.
*E06B 7/22* (2006.01)
(52) U.S. Cl. ..................... 49/498.1; 49/490.1
(58) Field of Classification Search ............... 49/475.1, 49/490.1, 498.1; 277/921; 296/146.9
See application file for complete search history.

(56) References Cited

U.S. PATENT DOCUMENTS 4,381,115 A * 4/1983 Ko .............................. 49/498.1
5,866,232 A * 2/1999 Gatzmanga .................. 428/122
6,623,014 B1 * 9/2003 Martin ......................... 277/630
6,623,832 B2 * 9/2003 Greven ......................... 428/121
6,677,020 B2 * 1/2004 Dron .......................... 428/36.91
7,017,305 B2 * 3/2006 Ikuta ........................... 49/498.1

FOREIGN PATENT DOCUMENTS

JP    2001-260768 A    9/2001

* cited by examiner

Primary Examiner—Gregory J. Strimbu
(74) Attorney, Agent, or Firm—Frishauf, Holtz, Goodman & Chick, P.C.

(57) ABSTRACT

A weather strip mounted on a door open edge of a vehicle body has a hollow sealing portion which includes first and second hollow portions which are connected. The second hollow portion protrudes from a side of an attaching portion which is mounted onto a flange of the door open edge, and the first hollow portion protrudes from the second hollow portion. The hollow sealing portion has an outer side, with which a door is brought into contact, the outer side including at least one surface of each of the first and second hollow portions and being, a smoothly continuous curved surface without any discontinuous points.

12 Claims, 7 Drawing Sheets

WEATHER STRIP

The present invention relates to a weather strip embedded in an open edge of a door section of a vehicle body, and in particular a weather strip which is embedded in a door open edge of a vehicle body provided with a slide type door or a hinge-type door and is provided with an attaching portion attached to the corresponding open edge and a hollow sealing portion shaped so that a first hollow portion and a second hollow portion are consecutively secured in the corresponding attaching portion.

BACKGROUND OF THE INVENTION

Figure 1:
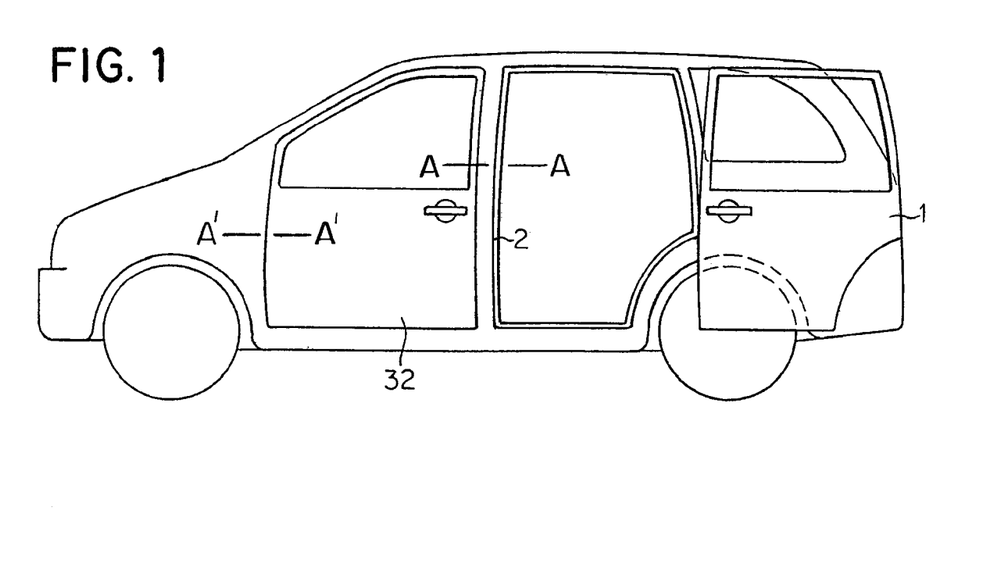
FIG. 1 is a side elevational view of a vehicle with a sliding rear door.
Figure 2:
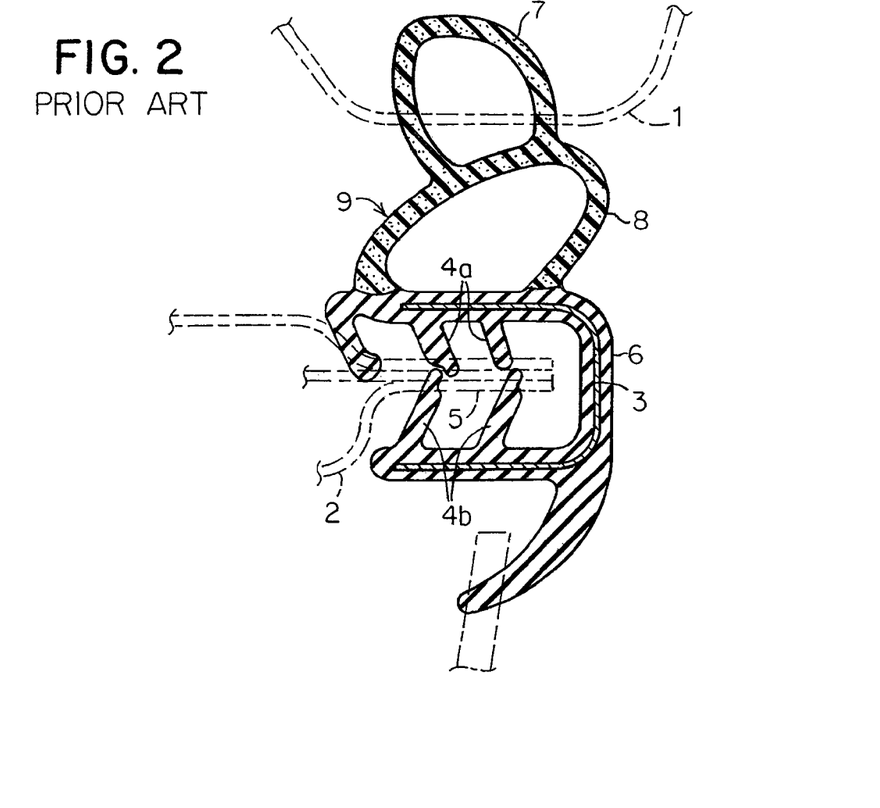
FIG. 2 is a sectional view of a prior art weather strip, which is taken along the line A-A in FIG. 1.

FIG. 1 shows a vehicle with a sliding rear door 1, and FIG. 2 shows a section of a weather strip, which is taken along the line A-A, attached to a door open edge 2 of the slide door 1. This type of weather strip is disclosed in Japanese Published Unexamined Patent Application No. 2001-260768, and the weather strip is composed of a solid rubber made attaching portion 6 which is provided with a core metal 3 embedded therein with its section roughly U-shaped, inwardly protruding retaining lips 4a and 4b opposed to each other inside the U-shaped core metal 3, and attached by being inserted into a flange 5 of the door open edge 2, and a sponge-rubber made hollow sealing portion 9 which is shaped so that the first hollow portion 7 and the second hollow portion 8 are consecutively secured on the side of the corresponding attaching portion 6.

Figure 3:
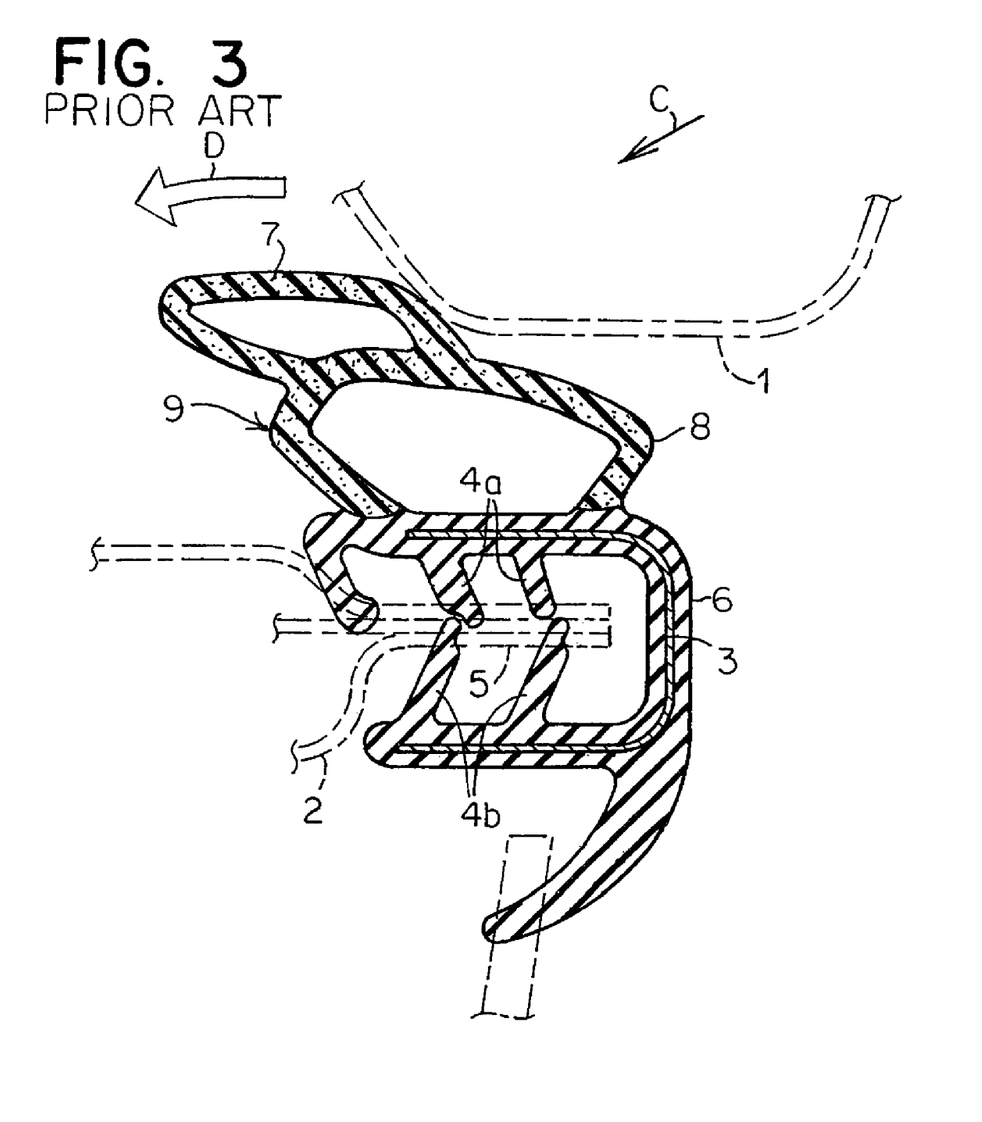
FIG. 3 is a sectional view of a weather strip shown in FIG. 2 when the door is closed.

When the slide door 1 shown in FIG. 1 is closed in the direction of arrow C in FIG. 3, the front edge of the slide door 1 is brought into contact with the first hollow portion 7, and sealing between the door 1 and the vehicle body is secured with the hollow sealing portion 9 collapsed. However, the front edge of the slide door 1 is brought into the root of the first hollow portion 7 due to unevenness of door fitting as shown in FIG. 3, and the entire hollow sealing portion is pushed down in the direction of the arrow D, thereby causing abnormal deflection, wherein there arises a problem in that a load for closing the door is radically increased and the door fitting is worsened.

Therefore, it is an object of the invention to provide a weather strip which can solve the above-described problem with such a type as shown in FIG. 2 and improve the door fitting when it is closed.

SUMMARY OF THE INVENTION

A weather strip according to the present invention is provided with an attaching portion embedded in a flange of a door opening portion of a vehicle and a hollow sealing portion shaped so that the first and second hollow portions are consecutively secured therein. The second hollow portion is composed of the first wall diagonally protruding from the flange root side of the attaching portion toward the outside of the vehicle in the reverse direction of the flange tip end, the second wall diagonally protruding from the first wall to the flange tip end outside the vehicle via the first bending point, the third wall diagonally protruding from the flange tip end side of the above-described attaching portion toward the outside of the vehicle in the reverse direction of the flange root side, the fourth wall diagonally protruding from the third wall toward the flange root side outside of the vehicle via the second bending point, and the fifth wall connecting the second wall to the fourth wall. The first hollow portion has one end thereof connected to the linkage part between the second wall and the fifth wall and the other end thereof connected to the linkage part between the fourth wall and the fifth wall. The side surface at the side having a portion, which is brought into contact with a door when the door is closed, of the above-described hollow sealing portion consisting of the first and second hollow portions is made into a smoothly continuous curved surface not having any discontinuous points.

According to the weather strip of the present invention, since the side with which the hollow sealing portion is brought into contact is made into a smoothly continuous curved surface, regardless of any position with which the door is brought into contact when the door is closed, in any door of not only a slide type but also a hinge type, the door slides on the curved surface without pushing down the entire hollow sealing portion, and pushes and collapses the hollow sealing portion while bending the same at the first and second bending points.

Therefore, such a great load is not required, by which abnormal deflection which pushes and collapses, as in the above-described prior art, the entire hollow sealing portion by a door being brought into contact with the root portion of the first hollow portion when the door is closed, thereby preventing the door closing from being worsened.

In a weather strip according to another aspect of the invention, a notched portion or recessed portion is formed inside the second bending point.

According to the weather strip of the invention, the weather strip is easily bent at the first and second bending points, and the hollow sealing portion becomes easy to be collapsed, wherein the door closing or fitting can be improved.

In a weather strip according to still another aspect of the invention, the above-described third wall is formed so as to have higher rigidity than that of the fourth wall.

According to the weather strip of the invention, since it is further securely bent at the second bending point, the door closing can be still further improved.

In a weather strip according to still another aspect of the invention, the length of the fifth wall is made shorter than that of the second wall.

According to the weather strip of the invention, it becomes further secure to push and collapse the entire hollow sealing portion.

In a weather strip according to still another aspect of the invention, when a door closed and is brought into contact with the weather strip, the second hollow portion is collapsed so that the linkage point between the second wall and the fifth wall is caused to move inwardly of the second hollow portion.

Other features and effects of the present invention will be more clearly understood in the following detailed description of the embodiments by those skilled in the art. It must be, however, noted that the technical scope of the invention is not limited to the embodiments and the accompanying drawings alone.

DESCRIPTION OF THE PREFERRED EMBODIMENTS

Figure 4:
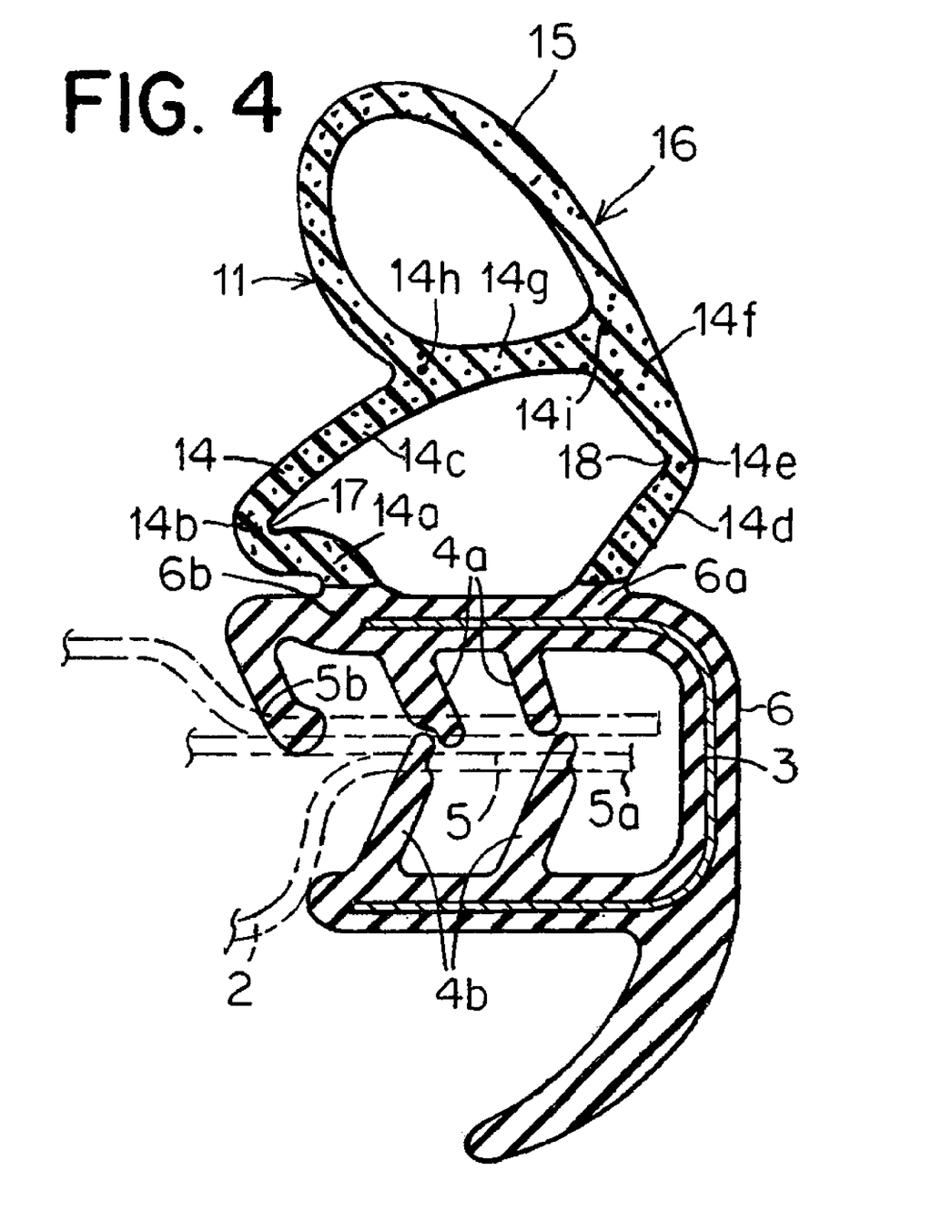
FIG. 4 is a sectional view of a weather strip according to the invention, which is taken along the line A-A in FIG. 1.

FIG. 4 is a sectional view showing a weather strip 11, which is taken along the line A-A of the weather strip mounted at a door open edge 2 of a vehicle shown in FIG. 1, as in a weather strip shown in FIG. 2. The weather strip shown in FIG. 4 is provided with an attaching portion 6, attached by being inserted onto a flange 5 of the door open edge 2, in which a core metal 3 is embedded with its section roughly U-shaped, inwardly protruding retaining lips 4a and 4b are opposed to each other inside the U-shaped core metal 3, and a hollow sealing portion 16 which is comprised of a second hollow portion 14 protruding from the side face of the attaching portion 6 toward the outside of a vehicle, and a first hollow portion 15 secured consecutively in parallel to the corresponding hollow portion 14. The flange 5 has a tip end 5a and a root 5b, and the attaching portion 6 has a flange tip end side 6a corresponding to the tip end 5a of the flange 5 and a flange root side 6b corresponding to the root 5b of the flange 5. The second hollow portion 14 is comprised of a first wall 14a slightly diagonally extending from the flange root side 6b of the attaching portion 6 toward the outside of the vehicle in the reverse direction of the flange tip end side 6a, a second wall 14c diagonally extending from the first wall 14a toward the flange tip end side 6a and toward outside the vehicle via the first bending point 14b, a third wall 14d diagonally extending from the flange tip end side 6a of the attaching portion 6 toward the outside of the vehicle in the reverse direction of the flange root side 6b, a fourth wall 14f diagonally extending from the third wall 14d toward the flange root side 6b and toward the outside of the vehicle via the second bending point 14e, and a fifth wall 14g connecting the second wall 14c to the fourth wall 14f, which is formed to be shorter than the length of the second wall 14c. The first and second bending points 14b and 14e are made thinner by the recesses 17 and 18, respectively, formed inwardly thereof. Also, the distance from the second bending point 14e to the flange 5 is longer than the distance from the first bending point 14b to the flange 5. Therefore, the hollow sealing portion 16 pushed and collapsed by the door front edge when the door 1 is closed can further securely bring about a deflection profile as desired.

In a secure deflection profile as desired when the door 1 is closed, the above-described fifth wall 14g is made roughly parallel to the flange face, the flange root side is inclined so as to be drawn near the flange, or in an illustrated example, the first wall 14a and the third wall 14d of the hollow sealing portion 16 whose entirety is composed of a sponge material such as sponge rubber may be formed of a solid material such as solid rubber and a thermoplastic elastomer having high rigidity, and it is recommended that the linkage part 14i between the fourth wall 14f and the fifth wall 14g is formed so as to become thicker at the inside thereof. Therefore, the rigidity of the linkage part 14i can be increased, and when the door is closed, smooth curving can be made easier at the second bending point 14e.

The first hollow portion 15 has one end thereof connected to the linkage part 14h between the second wall 14c and the fifth wall 14g and the other end thereof connected to the linkage part 14i between the fourth wall 14f and the fifth wall 14g. And, at the hollow sealing portion 16, the outer side at the side with which the door front edge can be brought into contact when the door is closed is made into a smoothly continuous curved surface without having any discontinuous points along the outer surface of the fourth wall 14f and at the boundary between the first and second hollow portions 14 and 15.

Figure 5:
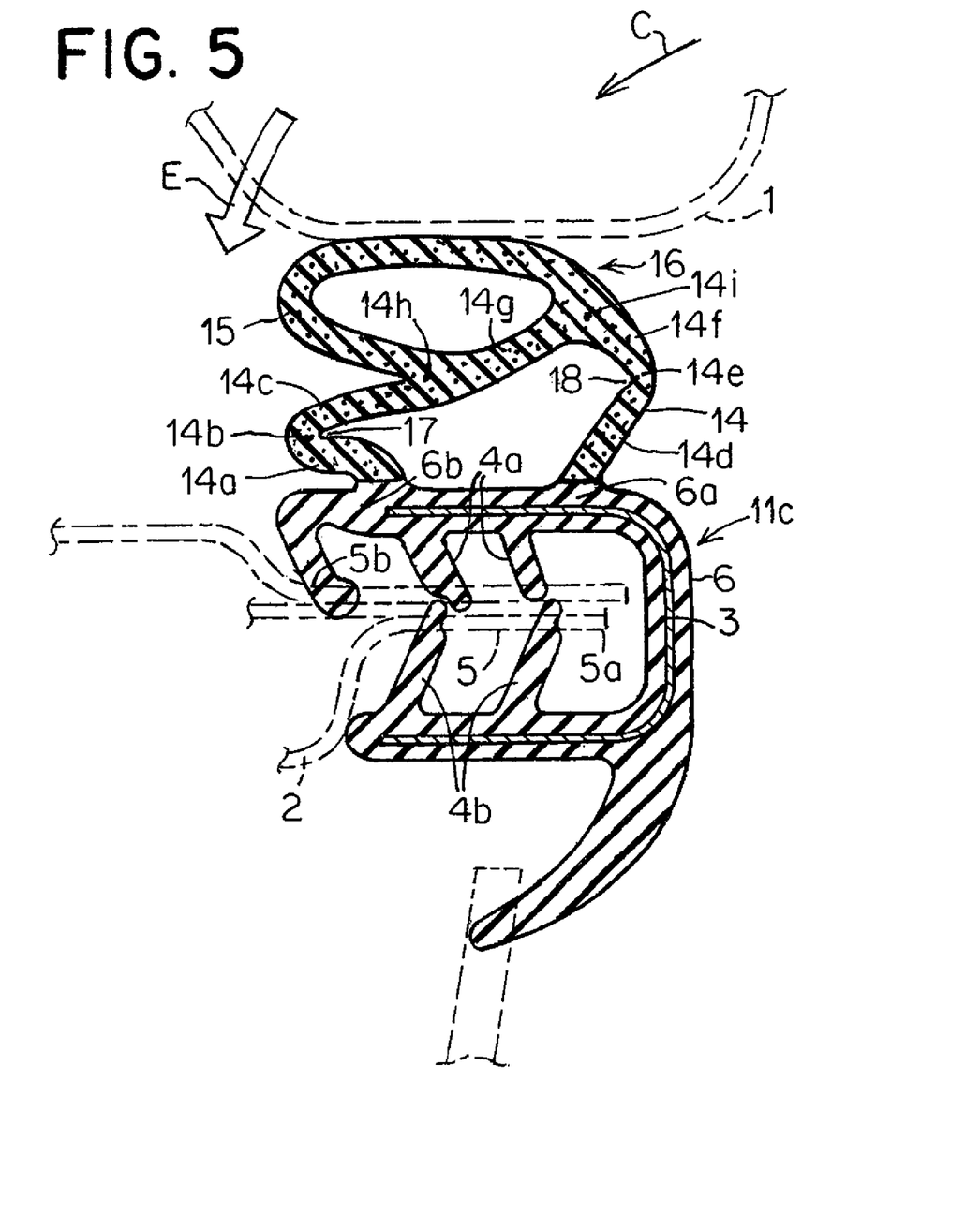
FIG. 5 is a sectional view of a weather strip shown in FIG. 4 when the door is closed.

FIG. 5 shows the hollow sealing portion 16 of the weather strip 11 being deformed by the door front edge when the slide door 1 moves in the direction of the arrow C and is closed. When the door 1 is closed, the door front edge slides on the curved surface of the first hollow portion 15 and pushes to collapse the first hollow portion 15, whereby the hollow sealing portion 16 is pushed and collapsed in the direction of the arrow E while the second hollow portion is bent at the first and second bending points 14b and 14e where the recesses 17 and 18 are formed. When the door is closed with the amount of deformation of the hollowing sealing portion 16 reduced as shown in FIG. 5, a load required for deformation of the hollow sealing portion 16 can be decreased, and the door closing can be improved.

Figure 6:
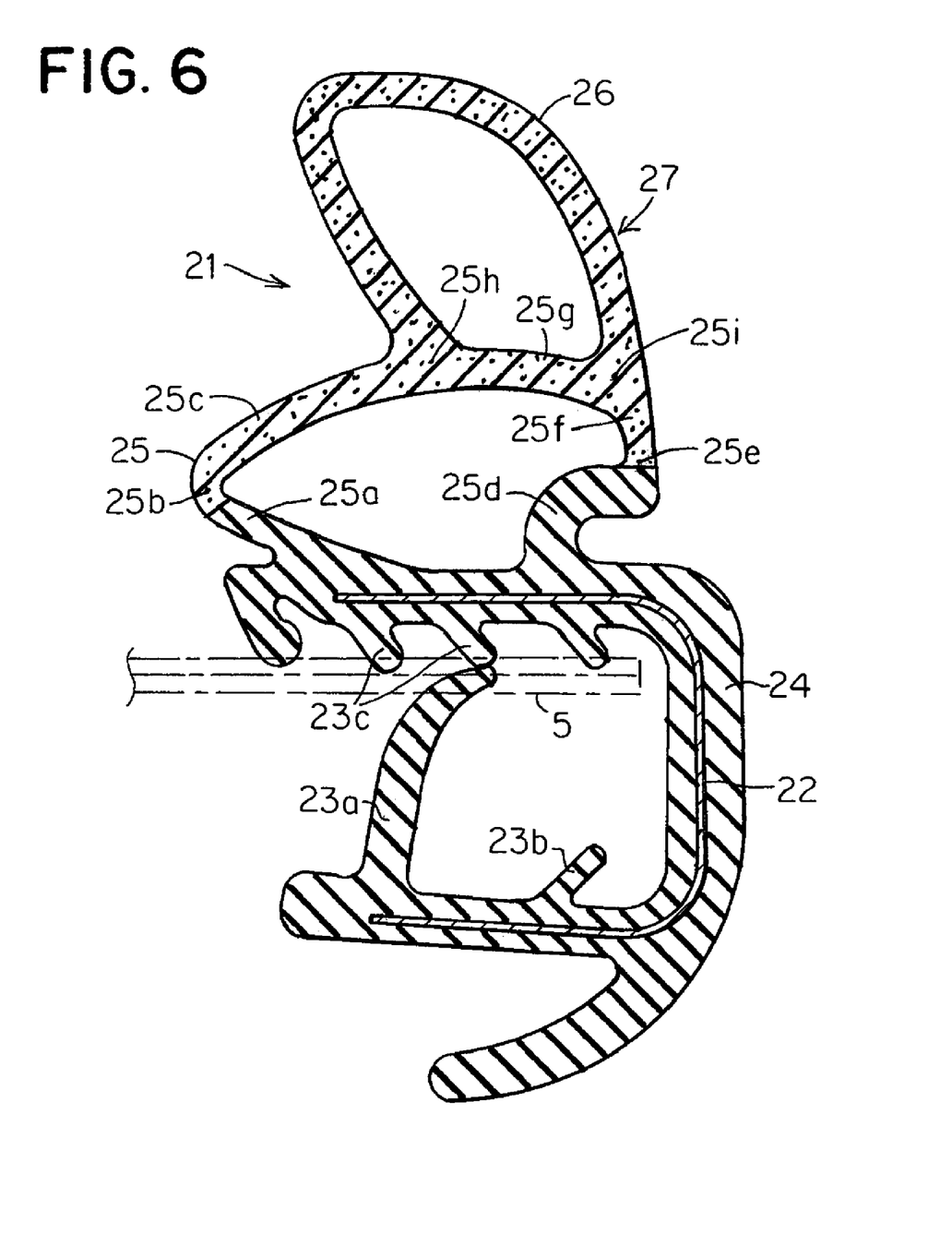
FIG. 6 is a sectional view of another weather strip according to the invention, which is taken along the line A-A in FIG. 1.

The weather strip 21 shown in FIG. 6 is a modified version of the weather strip 11 shown in FIG. 4. The weather strip 21 is provided with an attaching portion 24, attached by being inserted into the flange 5 of the door open edge, in which a core metal 22 whose section is roughly U-shaped is embedded, retaining lips 23a, 23b and 23c protrudes inwardly thereof so as to be opposed to each other, and a hollow sealing portion 27 composed of the second hollow portion 25 protruding from the side of the attaching portion 24 toward the outside of a vehicle, and the first hollow portion 26 secured consecutively in parallel to the corresponding hollow portion 25 thereon. As in the second hollow portion 14 of the above-described weather strip 11, in the second hollow portion 25, the first wall 25a at the flange root side is connected to the second wall 25c via the first bending point 25b, and simultaneously, the third wall 25d at the flange tip end side is connected to the fourth wall 25f via the second bending point 25e. Also, the fifth wall 25g connecting the second wall 25c to the fourth wall 25f is roughly parallel to the flange 5 and is formed so that its length is shorter than that of the second wall 25c.

And, the first wall 25a of the hollow portion 25 and the third wall 25d thereof are formed so as to have higher rigidity than that of the other walls 25c, 25f and 25g in order to make the same hard to be deflected when the door is closed. In order to secure high rigidity, in the illustrated example, the first wall 25a and the third wall 25d is formed of a material having higher rigidity than that of the other walls 25c, 25f and 25g, for example, solid rubber having high hardness and a solid material of a thermoplastic elastomer. However, these portions may be made thicker.

Both ends of the first hollow portion 26 are connected to the linkage part 25h between the second wall 25c and the fifth wall 25g and the linkage part 25i between the fourth wall 25f and the fifth wall 25g, respectively. The outer side at the side with which the door front edge can be brought into contact when the door 1 is closed is made into a smoothly continuous curved surface without having any discontinuous points along the outer surface of the fourth wall 25f. And, the second wall 25c and the fourth wall 25f are formed of a sponge material such as sponge rubber along with the first hollow portion 26, and the first bending portion 25b and the second bending portion 25e are located at the boundary between solid rubber having high rigidity and sponge rubber having low rigidity.

In the weather strip according to the present embodiment, in order that the door front edge makes the deflection profile of the weather strip 21 as desired when the door 1 is closed, the fifth wall 25g is formed roughly parallel to the flange. However, in addition thereto, as in the first hollow portion 15, it is recommended that the linkage part 25i between the fourth wall 25f and the fifth wall 25g is formed to be thicker at its inside.

In the present embodiment, when the slide door 1 is closed, the door front edge slides on the curved surface of the first follow portion 26 of the weather strip 21 and pushes to collapse the first hollow portion 26, and pushes to collapse the hollow sealing portion 27 while bending the second hollow portion 25 at the first and second bending points 25b and 25e, wherein the amount of deformation of the hollow sealing portion 27 is reduced.

Figure 7:
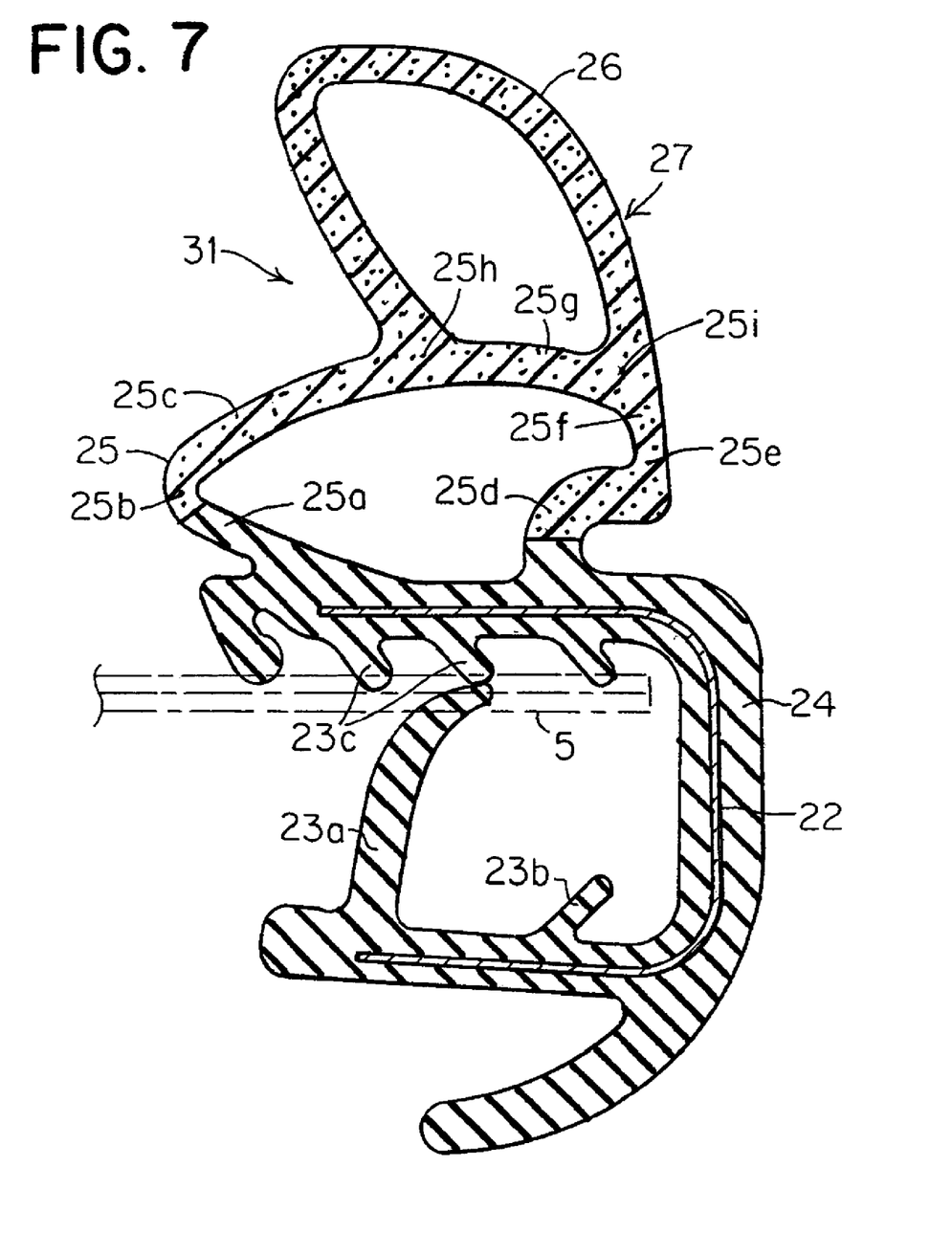
FIG. 7 is a sectional view of still another weather strip according to the invention, which is taken along the line A-A in FIG. 1.

The weather strip 31 shown in FIG. 7 has the same structure as that in the weather strip 21 shown in FIG. 6, excepting that instead of the third wall 25d of the weather strip 21 in FIG. 6 being entirely composed of a material having high rigidity, only the lower side thereof is composed of a material having high rigidity.

In the weather strips according to the above-described embodiments a description is given of only the sectional profile of the left side in FIG. 1, that is, the weather strip, with which the front edge of a slide or hinge type door is brought into contact, of the weather strip attached to the door open edge 2. However, it is a matter of course that the sectional profile of the other upper side, lower side and right side can be made into the same as above.

Figure 8:
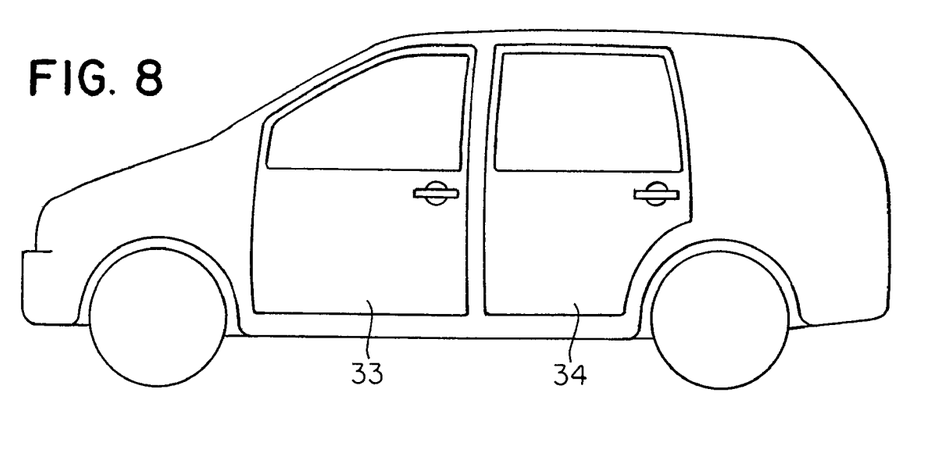
FIG. 8 is a side elevational view of a vehicle in which both front doors and rear doors are hinge-type doors.

Also, the weather strip according to the above-described respective embodiments is not limited to a type in which a door slides. The weather strip may be applicable to a weather strip which is attached to the door open edge of a hinge type front door 32 shown in FIG. 1, or to the door open edge of both a hinge type front door 33 and a hinge type rear door 34 as shown in FIG. 8. In this case, the cross-sectional views of the weather strip shown in FIGS. 4, 6 and 7, for example, can also be considered to be taken along line A'-A' in FIG. 1, for example.

What is claimed is:

1. A weather strip comprising:
    an attaching portion adapted to be mounted on a flange of an opening for a door of a vehicle, said flange having a root and a tip end, and said attaching portion having a flange tip end side corresponding to the tip end of the flange and a flange root side corresponding to the root of the flange; and
    a hollow sealing portion extending from said attaching portion, said hollow sealing portion including consecutive first and second hollow portions;
    wherein said second hollow portion comprises:
        a first wall diagonally extending from the flange root side of the attaching portion away from the flange tip end side of the attaching portion, and adapted to extend toward the outside of the vehicle;
        a second wall diagonally extending from the first wall at from a first bending point toward the flange tip end side of the attaching position, and adapted to extend toward the outside of the vehicle;
        a third wall diagonally extending from the flange tip end side of the attaching portion away from the flange root side of the attaching position, and adapted to extend toward the outside of the vehicle;
        a fourth wall diagonally extending from the third wall at from a second bending point toward the flange root side of the attaching position, and adapted to extend toward the outside of the vehicle; and
        a the fifth wall connecting second wall to the fourth wall;
    wherein a first end of the first hollow portion is connected to a linkage part located between the second wall and the fifth wall, and a second end of the first hollow portion is connected to a linkage part located between the fourth wall and the fifth wall; and
    wherein a surface of the hollow sealing portion is adapted to be brought into contact with the door when the door is closed, and includes a surface of the first hollow portion and a surface of the second hollow portion adjacent to said surface of the first hollow portion, said surface of the hollow sealing portion is smoothly continuous curved surface not having any discontinuous points.

2. The weather strip according to claim 1, wherein said second bending point comprises a notch or recess at an interior of the second hallow portion.

3. The weather strip according to claim 2, wherein said third wall is formed of a material having a higher rigidity than a rigidity of a material forming the fourth wall.

4. The weather strip according to claim 3, wherein when the door is brought into contact with the weather strip when the door is closed, the second hollow portion is pushed and collapsed while the linkage parts are moved inwardly relative to the second hollow portion.

5. The weather strip according to claim 2, wherein a length of said fifth wall is shorter than a length of said second wall.

6. The weather strip according to claim 5, wherein when the door is brought into contact with the weather strip when the door is closed, the second hollow portion is pushed and collapsed while the linkage part between the second wall and the fifth wall is moved inwardly toward the interior of the second hollow portion.

7. The weather strip according to claim 2, wherein when the door is brought into contact with the weather strip when the door is closed, the second hollow portion is pushed and collapsed while the linkage part between the second wall and the fifth wall is moved inwardly toward the interior of the second hollow portion.

8. The weather strip according to claim 1, wherein said third wall is formed of a material having a higher rigidity than a rigidity of a material forming the fourth wall.

9. The weather strip according to claim 8, wherein when the door is brought into contact with the weather strip when the door is closed, the second hollow portion is pushed and collapsed while the linkage part between the second wall and the fifth wall is moved inwardly toward an interior of the second hollow portion.

10. The weather strip according to claim 1, wherein a length of said fifth wall is shorter than a length of said second wall.

11. The weather strip according to claim 10, wherein when the a door is brought into contact with the weather strip when the door is closed, the second hollow portion is pushed and collapsed while the linkage part between the second wall and the fifth wall is moved inwardly toward an interior of the second hollow portion.

12. The weather strip according to claim 1, wherein when the door is brought into contact with the weather strip when the door is closed, the second hollow portion is pushed and collapsed while the linkage part between the second wall and the fifth wall is moved inwardly toward an interior of the second hollow portion.

* * * * *